Nov. 17, 1959     C. W. BERTHIEZ     2,912,905
BRACING DEVICE FOR OVERHANGING MACHINE MEMBER
Filed May 5, 1953     3 Sheets-Sheet 1

INVENTOR
Charles William Berthiez
By George H. Carey
ATTORNEY

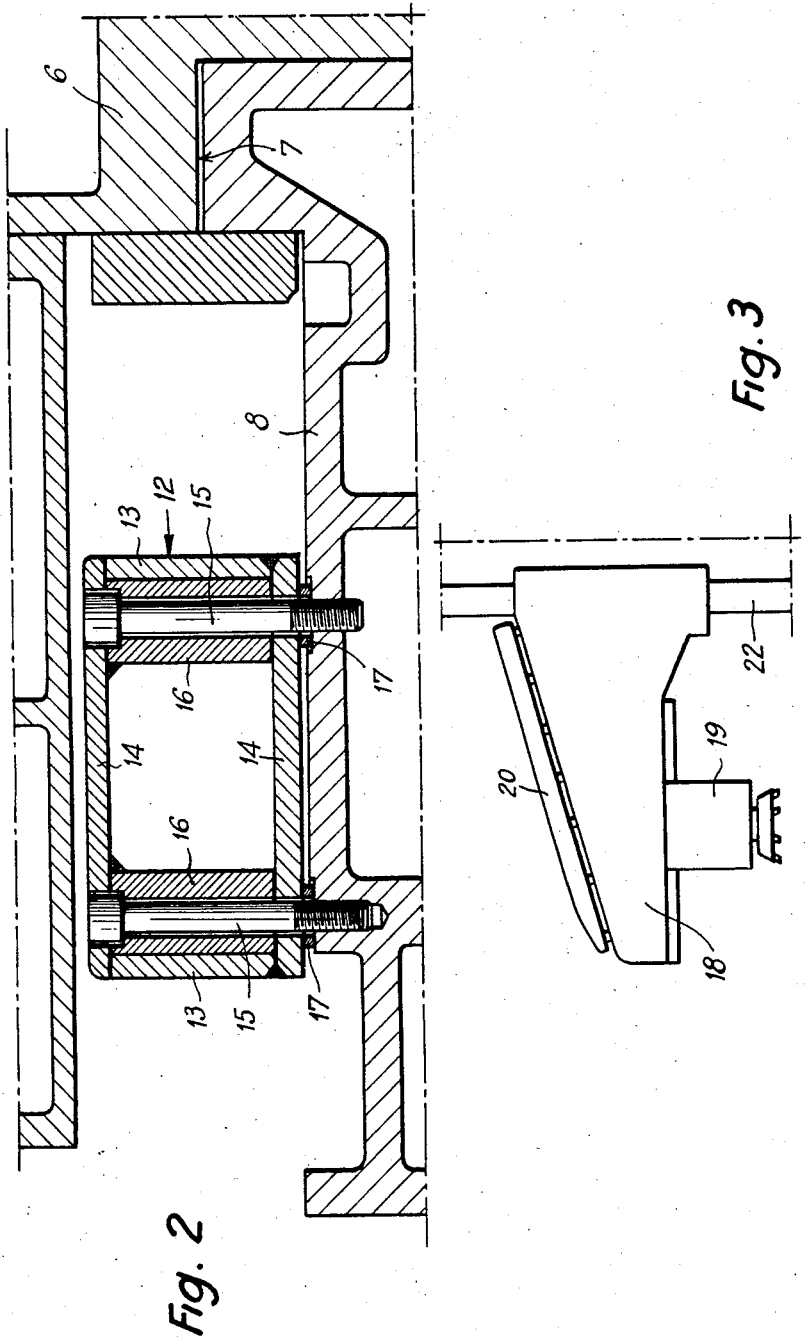

Nov. 17, 1959 C. W. BERTHIEZ 2,912,905
BRACING DEVICE FOR OVERHANGING MACHINE MEMBER
Filed May 5, 1953 3 Sheets-Sheet 3
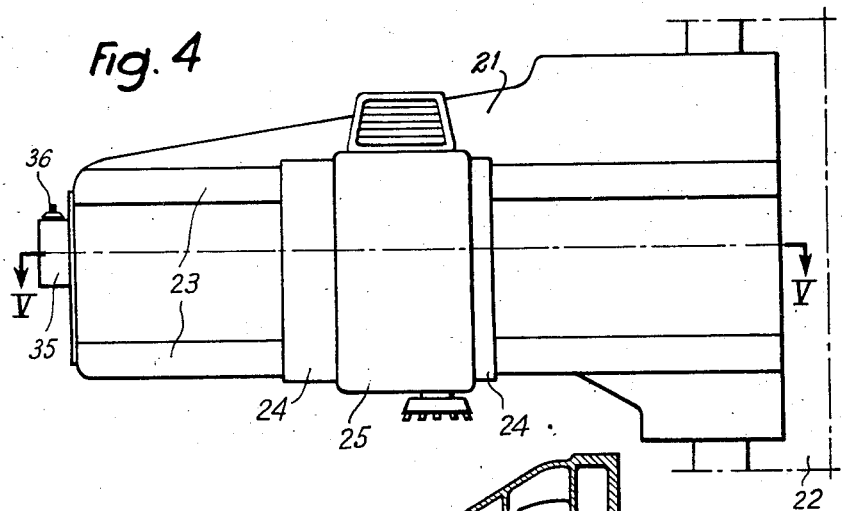
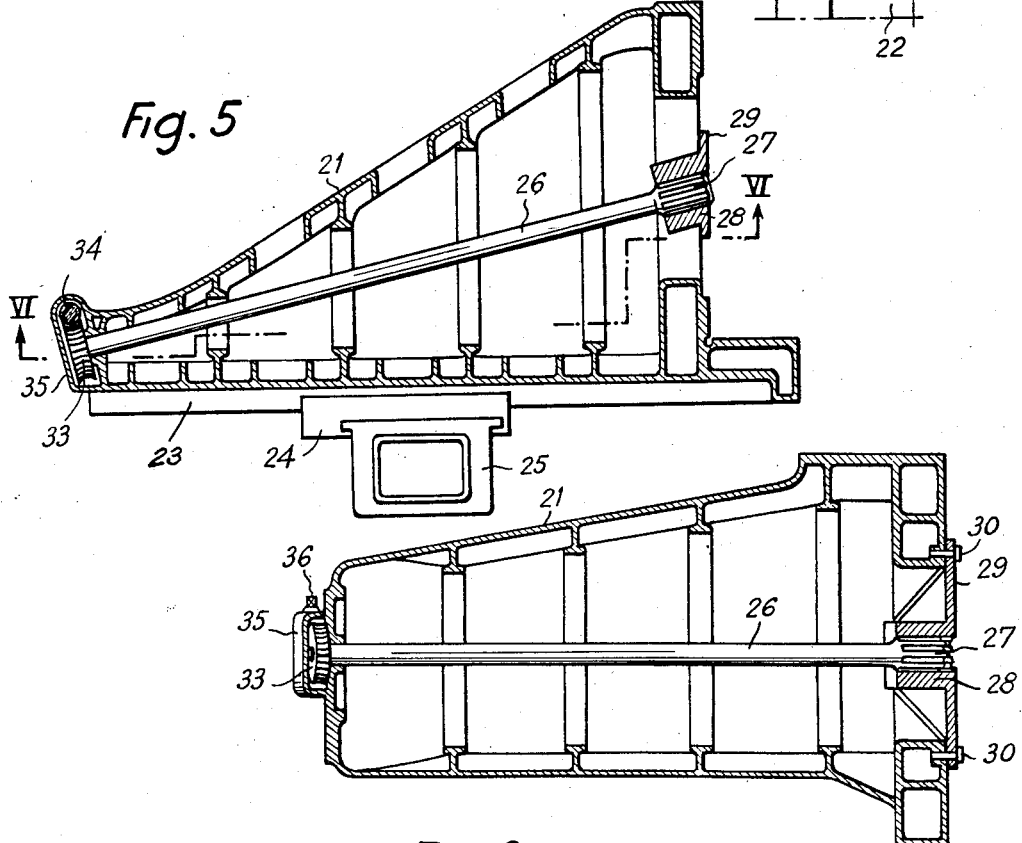
INVENTOR
Charles William Berthiez
ATTORNEY United States Patent Office 2,912,905
Patented Nov. 17, 1959

2,912,905
BRACING DEVICE FOR OVERHANGING MACHINE MEMBER

Charles William Berthiez, "La Cote" Bizy-Vernon, France, assignor to Société Nouvelle de Constructions de Machines-Outils et d'Outillages Procédés C.W.B., Paris, France Application May 5, 1953, Serial No. 353,176

Claims priority, application France May 16, 1952

7 Claims. (Cl. 90—16)

The invention relates to a device for preventing the deflections and distortions of a machine member mounted in overhang and subject to variable stresses, and more particularly to variable stresses originated by gravity. This is the case, for instance, with a machine member movable in a horizontal slideway and one end of which at least moves more or less out of the slideways and is thus overhanging for a variable amount of length. The protruding part of this movable member, being no longer supported by the slideways, bends under the effect of gravity to an extent varying according to the shape and the dimensions of said member with respect to the overhang length. In our co-pending application Serial No. 750,773, now Patent No. 2,674,925, issued April 13, 1954, for "Boring and Milling Machines and the Like Machine Tools" a milling and boring machine has been described the headstock of which is carried by a saddle on which it is capable of sliding along horizontal slideways, said saddle being adapted to slide vertically along a column having the function of supporting it. The headstock may partially move out of the horizontal slideways in which it slides, so that its overhanging part is subject to bending under the action of its own weight, the flexure being greater as the part advances out of the slideways. This results detrimentally to the precision of the machine, since the tool-carrying spindle and the toolings fixed to the headstock are then slightly out of line with respect to their normal position.

In a similar way, in machines fitted with a horizontal extension arm mounted in overhang along which a machining attachment, such as for instance a milling attachment of the present known type or an attachment for vertical turning is movable, as in my co-pending application Serial No. 121,941 for "Universal Machine Tool," now Patent No. 2,791,144 issued May 7, 1957, the arm bends under the weight of the machining-head and this flexure is greater as the machining head approaches the unsupported end of the arm. Furthermore the machining head is frequently mounted on a vertical face of the arm and so exerts upon this arm a torsional moment which also distorts the arm. These distortions of flexure and torsion of the arm are a hindrance when carrying out precision work on these machines.

The device according to the invention makes it possible to obviate these conditions owing to the fact that it comprises a part or element connecting the overhanging part of the machine member with the non-overhanging part of said member by means of strain producing components which act in the opposite direction to the direction in which the variable stresses are applied to said machine member.

The strain producing components are preferably adjustable.

Other features of the invention are brought out in the following specification and the accompanying drawings given merely by way of example and in which:

Fig. 2 is a fragmentary section, on a larger scale, along line II—II of Fig. 1;

Fig. 3 is an elevational outline view of an extension arm of a one-column or openside milling machine to which the invention is applied with a view to compensating the bending stresses;

Fig. 4 is also an elevational outline view of a one-column milling machine extension arm to which the invention is applied, according to another embodiment, with a view to compensating the torsional stresses;

Fig. 5 is a horizontal section of the extension arm along line V—V of Fig. 4; and Fig. 6 is a vertical section substantially along line VI—VI of Fig. 5.

Figure 1:
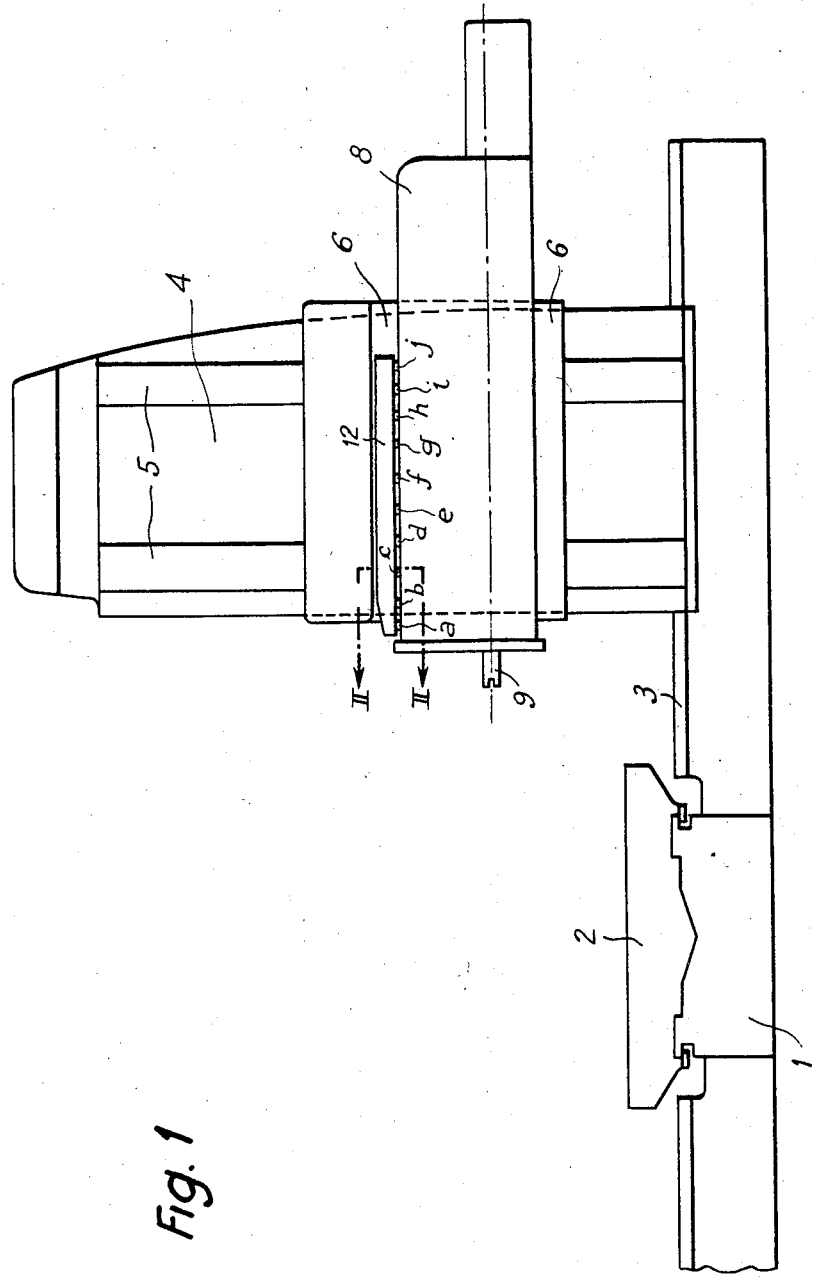
Fig. 1 is an elevational outline view of a milling and boring machine the headstock of which is fitted with a device according to the invention.

Figs. 1 and 2 show an embodiment of the invention in which a headstock 8 of a milling and boring machine is mounted for horizontal movement so that in some positions thereof it becomes disposed in overhanging or cantilever relation to its support and is subject to variable stresses, the main members of the machine being a bed 1 on which may slide a table 2 adapted to carry the workpiece and a second bed 3 on which may slide a column 4 fitted with vertical slideways 5 adapted to support and to guide a saddle 6. This saddle is in its turn provided with horizontal slideways 7 on which may slide the milling and boring headstock 8 to its different positions, the rotary spindle 9 of the headstock being parallel with the slideways 7 of the saddle.

Fig. 1 shows the headstock 8 in a position near its extreme right position. If, for machining purposes, the headstock is required to be shifted on the saddle 6 towards the left, the whole left part of this headstock becomes disposed in overhanging relation to the slideways which support it. The overhanging part of the headstock is thus subject to variable bending stresses which are a function of the length of that overhang. Even a slight flexure, say a few hundredths of a millimeter, is detrimental to the precision of the machine, especially as the displacement of the tool becomes increased when the spindle is required to be moved parallel to its axis and to protrude out of the headstock in order to reach the workpiece.

In order to remedy this difficulty, a part or element adapted to prevent this flexure and in Fig. 1 provided by a beam 12 is arranged on the headstock so as to fulfill conditions which will be understood from the description to follow. In the example chosen this beam is constituted by slabs such as 13 and 14, Fig. 2, welded together so as to constitute a hollow body of rectangular section having a large moment of inertia while being of moderate weight. The beam 12 so constituted is fixed to the upper face of the headstock 8 at a given number of points by means of screws 15. In order to ensure a greater rigidity of the beam and to prevent possible distortions caused by the tightening of the screws, these screws run through the beam within blocks 16 which are also welded to the inner faces of the walls of the beam. Fig. 1 shows the disposition of the various points where the beam is fixed to the headstock, these points being designated by references $a$ to $j$. The points from $f$ to $j$ are located on a portion of the headstock which never advances beyond the slideways 7 whatever may be the position of the headstock on the saddle. At these points washers 17 of equal thickness, for instance 10 mm., are placed between the beam and the upper face of the headstock. Washers of decreasing thickness are placed at the points from $a$ to $e$, the washers $e$ having for instance 9.8 mm. thickness, the washers $d$ 9.6 mm., and so on, the washer placed at the point $a$ having a thickness of 9 mm. When selecting the appropriate section of the beam with respect to the headstock section and the correct thickness of the various washers, the preliminary stressing of the beam so obtained is capable of counterbalancing, in the vertical plane of the various points from a to e, the weight of the different headstock portions the centres of gravity of which lie theoretically in these vertical planes. Thus, the operation of prestressing is carried out to secure a stressed condition as if the weight of the left hand side of the headstock were non-existent, so that this portion will have no tendency to bend and consequently to move downward as it comes into overhanging relation to the slideways of the saddle. The spindle axis remains as a result perfectly rectilinear, whatever may be the position of the headstock along the slideways 7 of the saddle, so that the precision of the machine will remain quite constant.

For given machining operations various tooling devices or attachments, such as for instance machining heads viz.; milling heads and so on, may be required on the headstock face. The weight of these tooling devices increases the flexure of the left hand portion of the headstock when this left hand portion overhangs beyond the slideways 7. In order to meet this condition the preliminary stressing of the beam may be increased by diminishing the thickness of the washers in a way corresponding to the weight of the added tooling device. To make this adjustment easily, it may be preferable to replace the washers of variable thickness placed at the points from a to e by vertically adjustable fitting pieces constituted for instance by jack screws. In given cases it may prove sufficient to place an adjustable jack screw at the point a and to place neither washers nor jack screw at the points b, c, d, e.

Fig. 3 shows another example of an application of the invention wherein extension arm 18 is mounted in overhang and this arm 18 is subject to variable bending stresses. In the example chosen the variable bending stresses are originated by the weight of a milling machine carriage 19 shiftable along the lower face of the extension arm 18 which is itself supported in overhang by a column 22.

To compensate for the possible flexure produced by the weight of the milling spindle carriage 19, a beam 20 is mounted (according to the invention) at the upper face of the arm 18, this beam being stressed concomitantly with mounting and in a direction so as to oppose the bending action of the weight of the milling spindle carriage. For this purpose the same set up as the one described in the previous example and shown in detail in Fig. 2 may be adopted.

Fig. 4 shows a third example of an application according to the invention wherein extension arm 21 is mounted in overhang on the column 22 and is subject to variable torsional stresses. In the example chosen, the variable torsional stresses are originated by the weight of a carriage 24 and a milling attachment 25 carried by said carriage which is capable of sliding along horizontal slideways 23 arranged on the extension arm.

The weight of the milling attachment 25 and the carriage 24 carrying it causes a torsional moment which distorts the extension arm and is thus detrimental to the machining precision of the machine. In order to compensate for this action, according to the invention an element opposing these distortions and constituted in this instance by a torsion bar 26 may be placed inside the extension arm. The right end 27 of this bar is splined and disposed with the splines in mesh with complementary grooves cut internally in the base of the hub 28 of a part 29 which is fixed to the arm 21 by means of screws 30. The other end of the torsion bar 26 is secured to a worm wheel 33 meshing with a worm 34 mounted in a casing 35 integral with the extension arm 21. One of the worm ends is extended outwardly of the casing 35 and is provided with an operating squared portion 36 for receiving a wrench for indexing the adjacent end of the torsion bar in the desired angle by rotating the worm wheel 33 upon rotation of the worm 34 in order to obtain the necessary preliminary stress opposing the torsional stresses developed by the weight of the carriage and the milling headstock.

Of course, the invention is not limited to the embodiments described and represented in the drawings, which have only been given by way of examples. Thus it would be still within the scope of the invention if on the same machine member were arranged both a beam and a torsion bar previously stressed in order respectively to oppose the bending stresses and the torsional stresses to which said machine member is subject.

What I claim is:

1. In a machine having a support, and a member supported by said support and having a substantial extent in cantilever relation to said support, said member being subject to stress producing bending strain in said cantilever extent thereof, the combination with said member of a beam element disposed with its length extending generally along said cantilever extent of said member, said beam element being bent in said length thereof so as to develop bending strain in said element, said element being connected at a plurality of points along its length to said member at corresponding points along said cantilever extent of said member and being disposed in relation to said member so that the strain in said bent beam element acts in the direction to oppose said stress brought upon said member.

2. In a machine the combination as defined in claim 1, said member being supported by said support for movement of said member generally parallel to said cantilever extent of said member to different positions of said member in each of which said member extends from said support in cantilever relation to said support, said beam element being carried by said member for movement therewith and being disposed and connected to said member so that said strain in said beam element is effective to oppose said stress brought upon said member in said different positions of said member in cantilever relation to said support.

3. In a machine the combination as defined in claim 1, which comprises a tool supporting carriage supported by said member for movement of said carriage along said cantilever extent of said member to different positions outwardly from said support.

4. In a machine the combination as defined in claim 1 which comprises means engaging said member and said beam element at said plurality of points and determining said bending strain developed in said element.

5. In a machine the combination as defined in claim 4 in which said engaging means is operable to adjust said bending strain developed in said beam element.

6. In a machine the combination as defined in claim 4 in which said engaging means comprises screw means engaging said member and said beam element at said plurality of points and operable to adjust said bending strain developed in said beam element.

7. In a machine the combination as defined in claim 4 in which said engaging means comprises a plurality of shims disposed respectively at said plurality of points between and engaging said beam element and said member, the thicknesses of said shims being less and greater according as the distance of said shims from said support along said member is greater and less to determine the bend in and said bending strain developed in said beam element.

References Cited in the file of this patent
UNITED STATES PATENTS

| 387,121 | Taylor | July 31, 1888 |
| 417,527 | Taylor | Dec. 17, 1889 |
| 995,437 | Casanova | June 20, 1911 |

(Other references on following page)

UNITED STATES PATENTS

| | | | |
|---|---|---|---|
| 1,312,297 | Bickett | Aug. 5, 1919 |
| 2,138,987 | Stuhlmacher | Dec. 6, 1938 |
| 2,464,415 | Philippe | Mar. 15, 1949 |
| 2,525,364 | Mennesson | Oct. 10, 1950 |
| 2,674,925 | Berthiez | Apr. 13, 1954 |

FOREIGN PATENTS

| | | |
|---|---|---|
| 5,480 | Great Britain | 1914 |
| 5,537 | Great Britain | 1889 |
| 157,744 | Australia | July 21, 1954 |
| 464,455 | Great Britain | 1937 |
| 1,067,405 | France | Jan. 27, 1954 |